Patented May 6, 1952

2,596,046

UNITED STATES PATENT OFFICE 2,596,046

HOMOGENEOUS SULFURIC ACID GEL

Harold H. Roth, Bay City, Mich., assignor to The Dow Chemical Company, Midland, Mich., a corporation of Delaware No Drawing. Application October 28, 1950, Serial No. 192,821

2 Claims. (Cl. 252—317)

This invention concerns certain gelatinous to solid compositions which are rich in sulphuric acid and contain the latter in available form. It also pertains to the preparation of such compositions.

It is known that the storage, shipment and use of sulphuric acid involves hazards, and precautions are observed for safe handling of the same. The material, being liquid, may flow from broken containers into contact with other substances, e. g. wood, water, or alkalies, etc., with which it is reactive or may splash, during use, causing injury to persons handling it.

It is an object of this invention to reduce or avoid such hazards by providing solid or gelatinous compositions which are rich in readily available sulphuric acid, but do not readily flow or splash, e. g. when a container of the same becomes accidently broken. Another object is to provide such compositions containing the acid in a form which is readily available for reaction with other substances, but which becomes gradually available to such a reaction instead of it all becoming immediately available as is the case with liquid sulphuric acid. Other objects will be evident from the following description of the invention.

It has been found that the sulphonic acids of alkenyl aromatic resins which are effective as thickening agents for water and other aqueous liquids may be incorporated, in minor amount, together with sulphuric acid of 85 per cent concentration or higher to form substantially homogeneous compositions varying from a highly viscous gelatinous mass to a solid mass, depending upon the proportions of water and of the sulphonated resin present in the compositions. It has further been found that the sulphuric acid of such composition is readily available for most of the purposes to which ordinary liquid sulphuric acid is adapted and that, in many instances, the composition may advantageously be used in place of liquid sulphuric acid as a chemical agent. It has still further been found that although most, if not all, of the sulphuric acid of the composition is readily available for reaction with other substances, not all of it becomes immediately available, as with liquid sulphuric acid, but instead the acid of the composition is gradually leached, or exuded, from the composition during reaction with another substance, e. g. an alkali. In some instances, this property of the acid becoming gradually, rather than immediately, available for reaction with other substances is of considerable advantage. For instance, substitution of said composition in place of liquid sulphuric acid in a fire extinguisher, of the type involving reaction of an acid with an aqueous metal carbonate solution, results in a more gradual and sustained generation of carbon dioxide and foam than is usually obtained with such extinguishers.

The alkenyl aromatic resins which may be sulphonated to form the sulphonated resin ingredient for the sulphuric acid compositions are thermoplastic polymers and copolymers of monoalkenyl aromatic compounds. They are of high molecular weight, e. g. 50,000 or above. They contain, in chemically combined form, at least 50 per cent by weight of a monoalkenyl aromatic compound having the general formula:

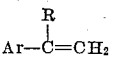

wherein Ar represents a monovalent aromatic radical and R represents hydrogen or the methyl radical. Examples of such alkenyl aromatic resins are the solid homopolymers of styrene, alpha-methylstyrene, ar-vinyltoluene, ar-vinylxylene, and ar-ethyl-vinylbenzene, etc.; the solid copolymers of two or more of such alkenyl aromatic compounds with one another; and solid copolymers of one or more of such alkenyl aromatic compounds with a minor amount of other polymerizable olefinic compounds, e. g. a copolymer of 90 weight per cent of styrene and 10 per cent vinyl chloride.

Any of such alkenyl aromatic resins may be sulphonated by reaction with usual sulphonating agents such as concentrated sulphuric acid or fuming sulphuric acid, etc., and certain of them, e. g. polystyrene and polymerized ar-vinyltoluene, have heretofore been sulphonated. However, not all sulphonic acids obtained by the sulphonation of such a resin, e. g. polystyrene, are effective as agents for thickening sulphuric acid to form homogeneous gelatinous or solid masses. The alkenyl aromatic resin sulphonic acids which are satisfactory for use in preparing the compositions of the invention are ones containing an average of from 0.55 to 0.9 sulphonic acid radical per aromatic radical of the resin and which when added, as sodium salts thereof, to 19 times their weight of water form aqueous solutions or suspensions having viscosities of 30,000 centistokes or higher at 25° C. Alkenyl aromatic resins which are sulphonated to an extent less than just indicated either do not have the necessary property of thickening sulphuric acid to form a gel-like mass, or must be used in undesirably large proportion to effect adequate thickening of the acid. Alkenyl aromatic resins which are sulphonated to an extent considerably greater than above-stated tend to dissolve in sulphuric acid instead of forming a gelatinous mass.

The sulphonation of the alkenyl aromatic resins may be accomplished in the presence or absence of solvents using concentrated sulphuric acid, or fuming sulphuric acid, as the sulphonating agent. The sulphonation is carried out at temperatures of 200° C. or lower, e. g. between 0° and 200° C., the optimum temperature being dependent on other conditions such as the kind, concentration, and proportion of sulphonating agent employed, the identity of the alkenyl aromatic resin under treatment, etc. In general, the sulphonation is advantageously carried out at the lowest temperature permitting a fairly rapid rate of reaction.

The alkenyl aromatic resin may be sulphonated with concentrated or fuming sulphuric acid in a proportion such that there is formed directly a homogeneous gel comprising the sulphonated polymer and at least 90 per cent by weight of unconsumed sulphuric acid. For such direct formation of the composition of the invention, from about 14 to 90 molecular equivalents of sulphuric acid of at least 90 weight per cent concentration is employed as a starting material per mole of alkenyl aromatic compound combined in the resin which is to be sulphonated. A mixture of the granular resin and concentrated sulphuric acid is usually heated at temperatures of from 100° to 200° C., preferably from 140° to 170° C. until the reaction has progressed to a stage at which the mixture is in the form of a substantially homogeneous gelatinous or solid body having the unconsumed sulphuric acid incorporated therein. When this condition is reached, the resin is usually sulfonated to a stage at which it contains an average of from 0.55 to 0.9 sulphonic acid radical per aromatic nucleus.

As procedure alternative to that just described, an alkenyl aromatic resin may be sulphonated at other temperatures, or using other proportions of the sulphonating agent, to form a sulphonated resin product containing an average of from 0.55 to 0.9 sulphonic acid radical per aromatic nucleus and having a property, when admixed with 19 times its weight of water, of forming a solution or dispersion having a viscosity of at least 30,000 centistokes at 25° C. For instance, such sulphonation may be accomplished at temperatures in the order of from 0° to 100° C. using an alkenyl aromatic resin such as polystyrene and employing, as the sulphonating agent, fuming sulphuric acid containing from 0.5 to 0.9 mole of dissolved sulphur trioxide per aromatic radical of the resin. The sulphonated resin may then be separated in usual ways, e. g. by washing the product thoroughly with water and drying it. The resin sulphonic acid, thus obtained, may be admixed with from 10 to 50 times its weight or more of sulphuric acid of at least 85 per cent concentration, whereupon it absorbs the acid and swells to form the substantially homogeneous gelatinous to solid composition of the invention. If any sulphuric acid remains unabsorbed when the swelling is complete, it may be poured or decanted from the product.

The gelatinous to solid homogenous compositions prepared in either of the ways just described contain at least 90 per cent by weight of sulphuric acid of 85 per cent concentration or higher. The acid is readily available for reaction with other substances, e. g. such composition may be reacted directly with alkalies. If desired, a large part of the sulphuric acid contained in the composition may be recovered in the form of an aqueous sulphuric acid solution by treating the composition with water in amount such as to form, with the sulphuric acid of the composition, an aqueous sulphuric acid solution of from 20 to 80 per cent concentration. This treatment causes shrinkage of the sulphonated resin with a result that more than half of the sulphuric acid of the composition is exuded therefrom.

The following examples describe certain ways in which the invention has been practiced, but are not to be construed as limiting its scope.

Example 1

A mixture of 3.5 grams of granular polystyrene and 100 milliliters of sulphuric acid of approximately 98 per cent concentration was heated at between 150° and 160° C. for 15 minutes, whereby the polystyrene was sulphonated and the entire mixture thickened to a homogeneous, gelatinous mass of dark amber color. This gelatinous product was extremely viscous and would scarcely flow. It contained about 97 per cent by weight of unconsumed sulphuric acid.

Example 2

Approximately 4 parts by weight of a dried and powdered polystyrene sulphonic acid (containing an average of about 0.7 sulphonic acid radical per benzene nucleus of the polystyrene) was admixed with 96 parts of sulphuric acid of about 98 per cent concentration. The mixture thickened rapidly and formed a homogeneous gelatinous body which was colorless, but was otherwise similar to that obtained in Example 1.

Example 3

This example illustrates an advantage of employing a gelatinous sulphuric acid composition of the invention, in place of ordinary liquid sulphuric acid, in a reaction with an aqueous sodium carbonate solution to produce a foam and carbon dioxide, e. g. for the extinction of fire. In one experiment, 5 grams of liquid sulphuric acid of about 98 per cent concentration was admixed with an aqueous sodium carbonate solution of 15 per cent concentration, said aqueous solution being in amount containing more than one molecular equivalent of sodium carbonate per mole of the sulphuric acid. A very vigorous reaction occurred with foaming and evolution of carbon dioxide, but the reaction was complete in from 4 to 5 seconds. The experiment was repeated, except that 5 grams of a gelatinous mass (composed of 95 parts of 98 per cent sulphuric acid and 5 parts of sulphonated polystyrene) was employed in place of the liquid sulphuric acid. A vigorous reaction with foaming and evolution of carbon dioxide occurred and continued for a period of from 30 to 40 seconds. In fire extinguishers of the foam type such vigorous, but continued, reaction for a half minute or more is often preferred over a more violent reaction of shorter duration.

Other modes of applying the principle of the invention may be employed instead of those explained, change being made as regards the method or compositions herein disclosed, provided the steps or compounds stated by any of the following claims or the equivalent of such stated steps or compounds be employed.

I therefore particularly point out and distinctly claim as my invention:

1. A substantially homogeneous gelatinous composition consisting essentially of between 98 and 90 per cent by weight of sulphuric acid of at least 85 per cent concentration and between 2 and 10 per cent of an alkenyl aromatic resin sulphonic acid, the aromatic nuclei of which are monocyclic, and which resin sulphonic acid contains an average of from 0.55 to 0.9 sulphonic acid radical per aromatic nucleus.

2. A substantially homogeneous gelatinous composition consisting essentially of between 90 and 98 per cent by weight of sulphuric acid of at least 85 per cent concentration and between 2 and 10 per cent of a polystyrene sulphonic acid, which polystyrene sulphonic acid contains an average of from 0.55 to 0.9 sulphonic acid radical per benzene nucleus.

HAROLD H. ROTH.

REFERENCES CITED

The following references are of record in the file of this patent:

UNITED STATES PATENTS

| Number | Name | Date |
|---|---|---|
| 2,283,236 | Soday | May 19, 1942 |
| 2,533,210 | Baer | Dec. 12, 1950 |

FOREIGN PATENTS

| Number | Country | Date |
|---|---|---|
| 580,366 | Germany | July 13, 1933 |